Oct. 17, 1967  H. V. VIND  3,347,451
MOTOR COMPRESSOR PARTICULARLY FOR
SMALL REFRIGERATION MACHINES
Filed Oct. 26, 1965

Patented Oct. 17, 1967

3,347,451
MOTOR COMPRESSOR PARTICULARLY FOR SMALL REFRIGERATION MACHINES
Holger V. Vind, Nordborg, Denmark, assignor to Danfoss A/S, Nordborg, Denmark, a corporation of Denmark
Filed Oct. 26, 1965, Ser. No. 505,255
Claims priority, application Germany, Oct. 31, 1964, D 45,755
5 Claims. (Cl. 230—58)

This invention relates generally to motor-compressors and more particularly to small refrigerating machine motor-compressors.

Motor-compressor units must generally start from a stationary condition against a back pressure. The extent of this back pressure can be controlled by the way the pressure system is constructed. For example, pressure systems may be relieved, if possible, so that the initial starting load is minimized. In each application, however, the prime mover must be so constructed so that it runs satisfactory at maximum back or counter pressure when starting and after the initial starting load is overcome, it must operate at its operating speed and load.

When electric motors are used as prime movers for compressors and constructed either as single-phase or three-phase motors, an auxiliary phase or starting windings are provided. The auxiliary phase is provided since electric motors generally have a rather low-starting torque. The value of this starting torque is not only dependent on the size of the motor but the type of auxiliary phase or starting windings. For example, a motor with resistance starting has a lower starting torque than the same motor with a more expensive capacity controlled starting.

Thus, until now, it has been necessary to correctly choose a motor for a particular application taking into consideration the starting problem when the motor is to carry a machine load and the normal operating load.

A principal object of the present invention is to provide a motor-compressor in which the starting torque of the motor is not as critical as heretofore.

A feature of the invention is the provision of a motor-generator in which the motor has auxiliary starting windings and provision of coupling means mechanically coupling the motor and the compressor positively during normal operation for driving the compressor from the motor. The coupling means comprises coupling devices cooperative to allow the motor rotor to rotate free of the machine load of the compressor during each initial starting and accelerating period, each of which corresponds to at least about three hundred electrical degrees, and effective to cooperatively positively couple the motor and the compressor upon completion of each initial starting and accelerating period. The motor thus is able to accelerate to a speed of rotation in its initial starting and accelerating period effective to achieve breakdown torque.

Thus, according to the invention, the motor is loaded only by its own bearing friction during its initial starting and accelerating period and the starting period is terminated by a positive coupling of the motor rotor to the main shaft of the compressor. At the moment of coupling the motor possesses a torque which is far beyond its starting torque so that it may readily overcome the inertia and back pressure that is necessary to start the compressor without the need of a complex control device and without need of drawing a heavy line current.

The coupling means effectively coupling the motor and the compressor in effect provides a "slip" which may be dimensioned or chosen in such a way that the motor, after having "slipped" reaches the number of revolutions necessary for the breakdown torque. In a two-pole motor, the effective number of revolutions may be in the order of four hundred fifty mechanical degrees. Thus, the invention makes it possible to use an inexpensive motor construction since the value of the breakdown torque and the number of revolutions of the breakdown torque is independent of whether the electrical motor is a relatively inexpensive resistance type starting motor or an expensive capacity type start motor.

Another feature of the invention is the manner in which the coupling devices in the coupling means of the invention are effectively positioned to carry out mechanical "slip" and thereafter effectively positively couple the motor in a compressor. According to the invention the rotor of the electric motor has less weight than the movable parts of the compressor so that the coupling devices or elements will assume their proper relative angular positions when the motor is turned off so that due to the difference in mass inertia the coupling elements are properly returned to their relative initial starting positions.

Other features and advantages of the motor-compressor in accordance with the present invention will be better understood as described in the following specification and appended claims, in conjunction with the following drawing, in which:

Figure 1:
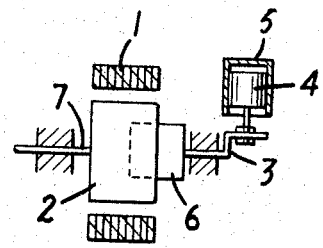
FIG. 1 is a schematic illustration of a motor-compressor in accordance with the invention.

As shown in the drawing in FIG. 1, an electric motor comprising a stator 1 and rotor 2 is connected to a main drive shaft 3 of a compressor, for example a small refrigeration compressor. The compressor is shown diagrammatically as comprising a piston 4 in a cylinder 5. The main or drive shaft of the compressor 3 and the rotor 2 of the motor are coupled through coupling means 6. The motor is provided with the usual rotor shaft 7 mounted rotatably on bearings as illustrated diagrammatically.

Figure 2:
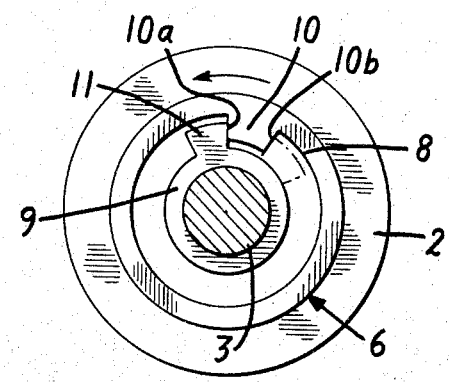
FIG. 2 is a cross-section view, on an enlarged scale, taken through coupling means effectively coupling the electric motor and compressor according to the invention illustrated in FIG. 1.

The coupling mechanism is illustrated in detail in FIG. 2. As illustrated in the drawing, a coupling device or element 8 is connected positively in fixed position with the rotor 2 for rotation therewith. A second coupling element 9 is connected to the main shaft 3 of the compressor. The two coupling elements are provided with teeth 10, 11 respectively which are disposed in a common plane transversely of the axis of the motor-compressor, for example, in a plane corresponding to the sheet of the drawing.

When the electric motor is in an "off" condition, the tooth 11 of the coupling element fixed to the main shaft 3 is disposed in a position shown in dotted lines in which it is disposed abutting a face 10b of the tooth 10. These elements will assume their relative angular position since the rotor has less weight than the compressor and, therefore, less inertia so that when the motor is turned "off" the two teeth will assume the above-described relative position.

When the motor is started, the tooth 10 will rotate free of the tooth 11 so that the motor 2 is free of the machine load corresponding to the load of the compressor and is free to "slip" mechanically. The motor-compressor electric motor rotor will rotate at substantially maximum speed and due to the "slip" corresponding to about three hundred electrical degrees which corresponds to substantially three hundred mechanical degrees on the example illustrated, the motor runs loaded only with its own bearing friction. After the initial starting and accelerating period defined by the "slip," approximately three hundred electrical degrees the motor has built up a sufficiently start torque so that it can, without difficulty, start the compressor moving it even against a back pressure therein. Thus, in the example illustrated, when the tooth 10 has rotated to the position shown in FIG. 2, it engages the tooth 11 with its leading face 10a and positively couples the drive shaft 3 and the rotor 2.

Figure 3:
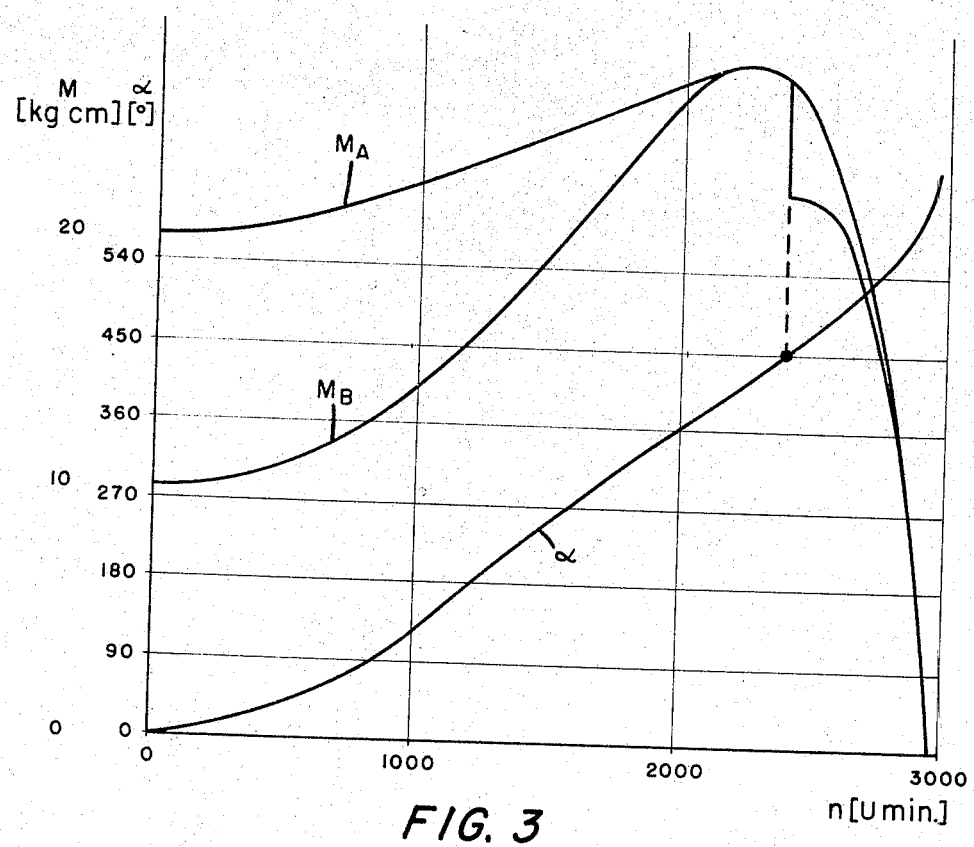
FIG. 3 is a diagram of torque characteristics of two pole motors for illustrating the principles of the invention.

The characteristics of the motor-compressor according to the invention are illustrated in FIG. 3. In the diagram shown in the drawing, the x-axis is denoted $n$ representative of the number of revolutions of the motor and the y-axis represents the motor torque as well as the angles $\alpha$ of rotation.

The curve MA corresponds to a two-pole single-phase motor with capacity start and the curve MB corresponds to an otherwise identical motor except it is provided with resistance start. The curve $\alpha$ corresponds to the extent of angular rotation from an initial start position for both motors. The torque curves are typical for single-phase motors with auxiliary start windings. From a study of the chart it can be seen that independent of the kind of auxiliary start the breakdown torque will be achieved at about 2200–2400/r.p.m.

As the revolutions rise, a conventional starter switch, not shown, is opened in the two types of motors, at which time the torque curve decreases. It can be seen from the curves that the rotor, after one revolution (360°) has already achieved a speed corresponding to revolutions in the order of 2000/min., and the breakdown torque is exceeded at an angle of about 450. Moreover, at an angle of about 300 degrees, already 80% or more of the breakdown torque is achieved. This latter value is therefore the value which corresponds to the maximum starting torque when the auxiliary starting winding is disconnected and therefore is sufficient for overcoming the back pressure in the pressure system or compressor.

Those skilled in the art will understand that it is possible to construct the mechanical coupling means of the invention somewhat differently. For example, a spring which might be coiled on the main shaft could be provided to permit a mechanical "slip" and then restore the coupling element connected to the compressor shaft to a position relative to the other coupling element in the manner before described. The strength of the spring should be negligible, however, relative to the motor torque on starting and strong enough for direct operation or drive of the compressor. Moreover, an elastic torsion rod structure could be used on the main shaft connection, for example, to allow the type of operation heretofore described to carry out a "slip" and then positive mechanical connection after an initial starting and acceleration period of a duration as above described.

While a preferred embodiment of the invention has been shown and described, it will be understood that many modifications and changes can be made within the true spirit and scope of the invention.

What I claim and desire to secure by Letters Patent is:

1. A motor-compressor comprising, a refrigeration compressor, an electric motor having an auxiliary starting phase, coupling means mechanically coupling said motor and said compressor positively for driving said compressor from said motor, said coupling means comprising coupling devices cooperative to allow said motor to rotate free of the machine load of said compressor during each initial starting and accelerating period each corresponding to at least about 300 electrical degrees and effective to cooperatively positively couple said motor and said compressor upon completion of each of said initial starting and accelerating periods, and said motor having the characteristic of being able to accelerate to a speed of rotation in said initial starting and accelerating period effective to achieve a major portion of breakdown torque.

2. A motor-compressor comprising, a refrigeration compressor, an electric motor having an auxiliary starting winding, coupling means mechanically coupling said motor and said compressor positively for driving said compressor from said motor, said coupling means comprising coupling devices cooperative to allow said motor to rotate free of the machine load of said compressor during each initial starting and accelerating period each corresponding to at least about 300 electrical degrees and effective to cooperatively positively couple said motor and said compressor upon completion of each of said initial starting and accelerating period, and said motor having the characteristic of being able to accelerate to a speed of rotation in said initial starting and accelerating period effective to achieve about 80% of breakdown torque.

3. A motor-compressor according to claim 2, in which said motor comprises a rotor and said compressor comprises a main drive shaft, said coupling elements comprising two toothed elements connected respectively to said rotor and said main drive shaft, each toothed element comprising a tooth, each tooth being disposed in a common plane substantially normal to a principal axis of rotation of said motor-compressor, both teeth being angularly spaced relative to each other effectively to allow relative rotation of said rotor of about 300 electrical degrees before said teeth positively engage and said rotor positively drives said main shaft.

4. A motor-compressor according to claim 3, in which said compressor comprises driven components connected to said shaft, in which said rotor has less mass-inertia than said driven components of said compressor.

5. A motor-compressor comprising, a refrigeration compressor, an electric motor having an auxiliary starting phase, coupling means mechanically coupling said motor and said compressor positively for driving said compressor from said motor, said coupling means comprising coupling devices cooperative to allow said motor to rotate free of the machine load of said compressor during each initial starting and accelerating period each corresponding to at least about 300 mechanical degrees and effective to cooperatively positively couple said motor and said compressor upon completion of each of said initial starting and accelerating period, and said motor having the characteristic of being able to accelerate to a speed of rotation in said initial starting and accelerating period effective to achieve a major portion of breakdown torque.

References Cited

UNITED STATES PATENTS

| 1,073,641 | 9/1913 | Smith. | |
| 2,084,709 | 6/1937 | Sherman | 103—57 X |

FOREIGN PATENTS 1,255,989  2/1961  France.

ROBERT M. WALKER, *Primary Examiner.*